(12) United States Patent
Slopsema et al.

(10) Patent No.: US 6,959,682 B2
(45) Date of Patent: Nov. 1, 2005

(54) ENGINE BALANCER WITH CHAIN DRIVE VIBRATION ISOLATION

(75) Inventors: Thomas Alan Slopsema, Holt, MI (US); John Meade Beardmore, Howell, MI (US)

(73) Assignee: General Motors Corporation, Detroit, MI (US)

( * ) Notice: Subject to any disclaimer, the term of this patent is extended or adjusted under 35 U.S.C. 154(b) by 84 days.

(21) Appl. No.: 10/235,104

(22) Filed: Sep. 5, 2002

(65) Prior Publication Data

US 2004/0045520 A1 Mar. 11, 2004

(51) Int. Cl.$^7$ ................................................ F02B 75/06
(52) U.S. Cl. ...................... 123/192.1; 74/574; 464/180
(58) Field of Search ........................ 123/192.1, 192.2; 74/604, 574; 474/94; 464/180

(56) References Cited

U.S. PATENT DOCUMENTS

| | | | | |
|---|---|---|---|---|
| 3,216,267 A | * | 11/1965 | Dolza | 474/94 |
| 4,000,666 A | * | 1/1977 | Ito et al. | 123/192.2 |
| 5,657,728 A | * | 8/1997 | Diggs | 123/192.2 |
| 5,927,149 A | * | 7/1999 | Moody | 74/574 |
| 5,931,052 A | * | 8/1999 | Zhao et al. | 74/574 |
| 6,234,127 B1 | * | 5/2001 | Simpson et al. | 123/192.2 |
| 6,283,076 B1 | * | 9/2001 | Simpson | 123/192.2 |

FOREIGN PATENT DOCUMENTS

DE 3942761 A1 * 8/1991 ............ F16H/7/06

* cited by examiner

*Primary Examiner*—Noah Kamen
(74) *Attorney, Agent, or Firm*—Christopher DeVries; Leslie C. Hodges

(57) ABSTRACT

A chain-driven engine balancer has an elastomeric or compliant isolator ring in a balancer drive sprocket to decouple chain whine vibration from an associated balance shaft. The isolator substantially reduces the transmission of chain whine noise to the engine structure. A splined isolator ring is placed between internal and external splines formed on a toothed outer ring and hub respectively of the associated sprocket. The splines are configured to be in loose engagement so that, upon failure of the elastomeric isolator ring, direct engagement of the hub and ring splines with one another will maintain the timing of the balance shafts with respect to the engine crankshaft. In a specific embodiment, application of an isolator ring in only the most heavily loaded sprocket of dual balance shaft sprockets driven in series by the chain eliminates most of the vibration transmission. However, isolation of multiple chain sprockets could be desirable.

3 Claims, 2 Drawing Sheets

ENGINE BALANCER WITH CHAIN DRIVE VIBRATION ISOLATION

TECHNICAL FIELD

This invention relates to chain-driven engine balancers and, more particularly, to a balancer with a vibration isolation ring in at least one balancer drive sprocket.

BACKGROUND OF THE INVENTION

It is known in the art to provide an internal combustion engine having an inherent unbalance condition with an engine mounted balancer driven by the engine crankshaft and rotating in timed relation therewith to offset some or all of the engine unbalance condition. Conventionally the balancer may be driven through a gear or chain drive and may include a single balance shaft or multiple balance shafts. As used in the following specification and claims, the terms "balancer" and "engine balancer" refer to a complete balance system or specified components thereof, including balance shafts or weights and their drive mechanisms, such as chains, drive and driven sprockets, gears and associated or equivalent components. "Engine output shaft" refers to a crankshaft or other output shaft, "Rotary input member" and "rotary output member" refer to input and output sprockets, gears and other equivalent devices.

In particular balancer embodiments adaptable to engines having an inherent second order pitching couple or vertical shaking force, the balancer is provided with dual balance shafts mounted on opposite sides of the engine block and rotating in opposite directions at twice crankshaft speed. The balancer shafts are driven by a chain which is engaged by an output sprocket connected with the engine crankshaft and driving first and second input sprockets. The first input sprocket is mounted on the first balance shaft and the second input sprocket is mounted on the engine and connects with a drive gear which engages a driven gear on the second balance shaft for rotating the second shaft in a direction opposite that of the first balance shaft and the engine crankshaft. In this application, a so-called inverted tooth chain is utilized which produces a high frequency vibration or "chain whine". The vibration is carried into the balance shafts and the associated engine block which transmits the chain whine noise as audible engine noise.

A means of interrupting or decoupling the transmission of the chain whine vibration or noise from the drive chain to the engine-mounted balance shafts was accordingly desired to minimize this cause of audible engine noise.

SUMMARY OF THE INVENTION

The present invention provides an engine balancer with a compliant or elastomeric isolator ring mounted in at least one of the balancer drive sprockets to decouple chain whine vibration from the associated balance shaft. The isolator ring in the sprocket substantially reduces the audible transmitted chain whine noise from the engine structure. The invention utilizes a splined isolator ring which is placed between internal and external splines formed on the toothed outer ring and the hub, respectively, of the associated sprocket. The splines on the hub and outer ring are configured to be in loose engagement so that, upon failure of the elastomeric isolator ring, direct engagement of the hub and ring splines with one another will maintain the timing of the balance shafts with respect to the engine crankshaft so that engine vibration offset by the balance shafts will be maintained under all circumstances.

In a specific embodiment, the chain drives the first balance shaft directly from the engine output sprocket and the second balance shaft is driven from the drive sprocket of the first balance shaft to the drive sprocket of the second balance shaft. In this embodiment, application of the splined isolator ring in the drive sprocket of the first balance shaft alone is effective to eliminate most of the structure borne chain whine noise. Application of an additional isolator ring to the drive sprocket of the second balance shaft, which is driven in part through a supplemental gear drive, does not provide much further reduction in the radiated chain whine noise transmitted from the engine. However, it is contemplated that, in other chain applications or balancer drive arrangements, use of a second isolator ring might provide a substantial noise reduction.

These and other features and advantages of the invention will be more fully understood from the following description of certain specific embodiments of the invention taken together with the accompanying drawings.

DESCRIPTION OF THE PREFERRED EMBODIMENT

Figure 1:
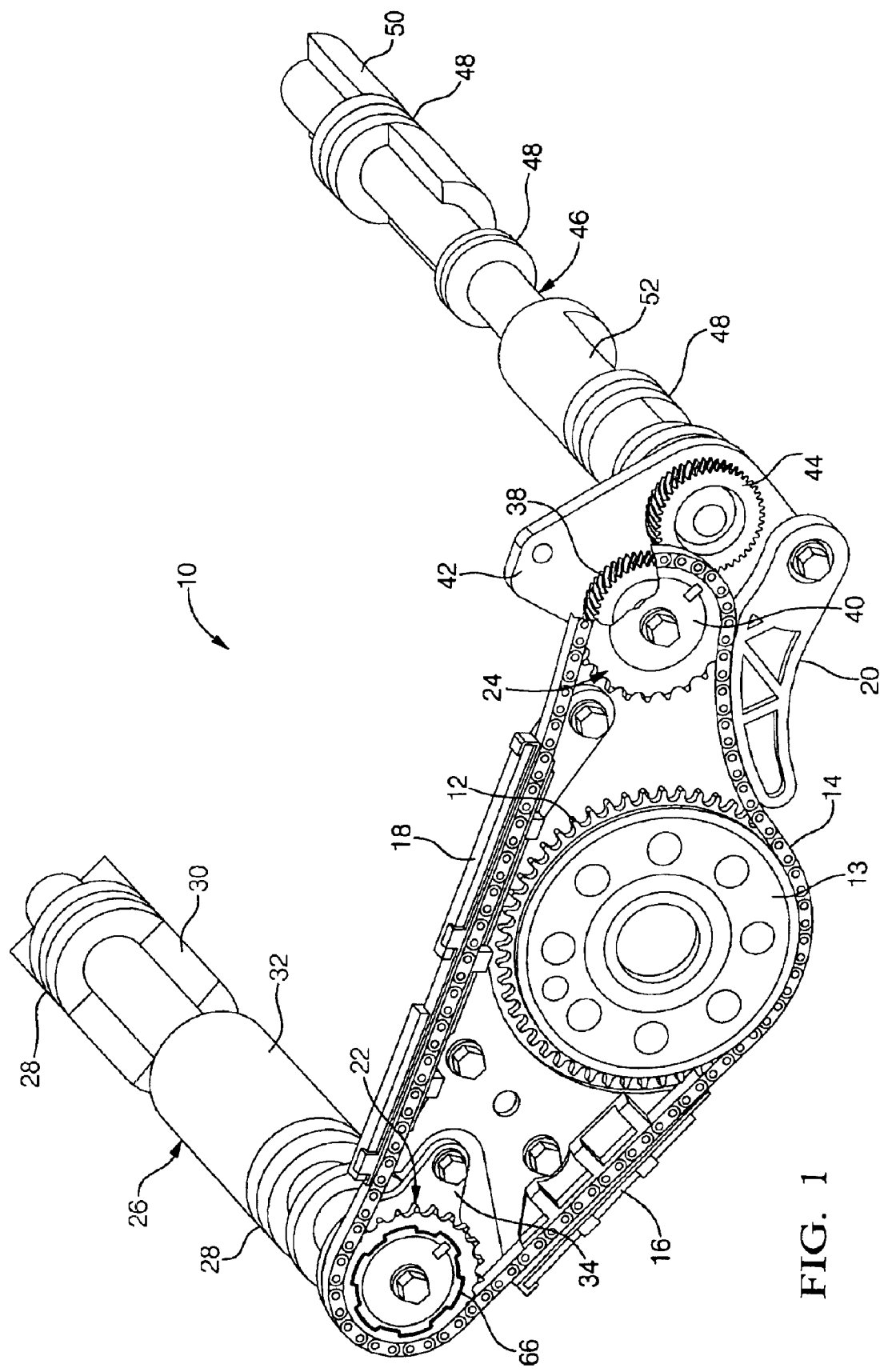
FIG. 1 is an isometric view of an exemplary embodiment of engine balancer having chain drive vibration isolation in accordance with the invention.

Referring first to FIG. 1 of the drawings in detail, numeral 10 generally indicates a first embodiment of an engine balancer for application to an engine having a second order pitching couple but exemplary, in general, of chain driven engine balancers for offsetting inherent unbalance conditions in various types of engines.

The balancer 10 includes an engine output sprocket 12, which in assembly is mounted on and rotatable with the engine crankshaft 13, adjacent to the rear end thereof. Sprocket 12 engages a drive chain 14 that runs along guides 16 and 18 and is tensioned by a spring chain tensioner 20. The chain extends laterally in either direction from the sprocket 12 and engages a first input sprocket 22 and a second input sprocket 24.

The first input sprocket 22 is directly connected to a first balance shaft 26 which includes bearing journals 28 supported in bearings, not shown, mounted to a left side wall of the engine, not shown. Shaft 26 includes front and rear balance weights 30, 32 which are offset from the shaft axis in opposite directions so as to create an unbalance couple rotating in the direction of crankshaft rotation and at a speed twice crankshaft speed by reason of sizing of the input sprocket 22 at half the diameter of the output sprocket 12. Balance shaft 26 and the connected drive sprocket 22 are supported at the rear end by a bracket 34 which, in assembly, is bolted to a rear wall, not shown, of the engine frame.

The second input sprocket 24 is connected with a drive gear 38 which is rotatable with the second input sprocket on a shaft 40 supported by a mounting bracket 42. Drive gear 38 engages a driven gear 44, also supported by bracket 42 with a fixed spacing from the drive gear 38. Gear 44 is directly connected to a second balance shaft 46 which also includes bearing journals 48 supported in bearings, not shown, mounted to the right side of the engine frame. Second balance shaft 46 also carries front and rear balance weights 50, 52 which extend in opposite directions from the balance shaft axis and thus create, when rotated, a rotating unbalance couple which rotates at a speed twice crankshaft speed in a direction opposite to rotation of the crankshaft.

The phasing of the balance weights on balance shafts 26 and 46 is such that the vertical forces of the two balance shafts add to one another and the lateral forces of the two shafts balance one another. The resulting unbalance force is a vertical rocking couple applied to the engine frame and timed in opposition to the rocking couple generated by the internal engine components so that the inherent engine couple is balanced by the balancer 10.

By altering the positions of the balance weights to extend in the same directions on their respective shafts, the balancer could be modified to provide a vertical shaking force for offsetting an inherent vertical shaking force of another engine configuration.

In order to minimize variations in the backlash of the drive and driven gears 38, 44, the bracket 42 is made of a ferrous material having a similar expansion coefficient to that of the gears. The gear center distances are thereby maintained essentially constant over a variety of operating temperatures of the engine.

Figure 2:
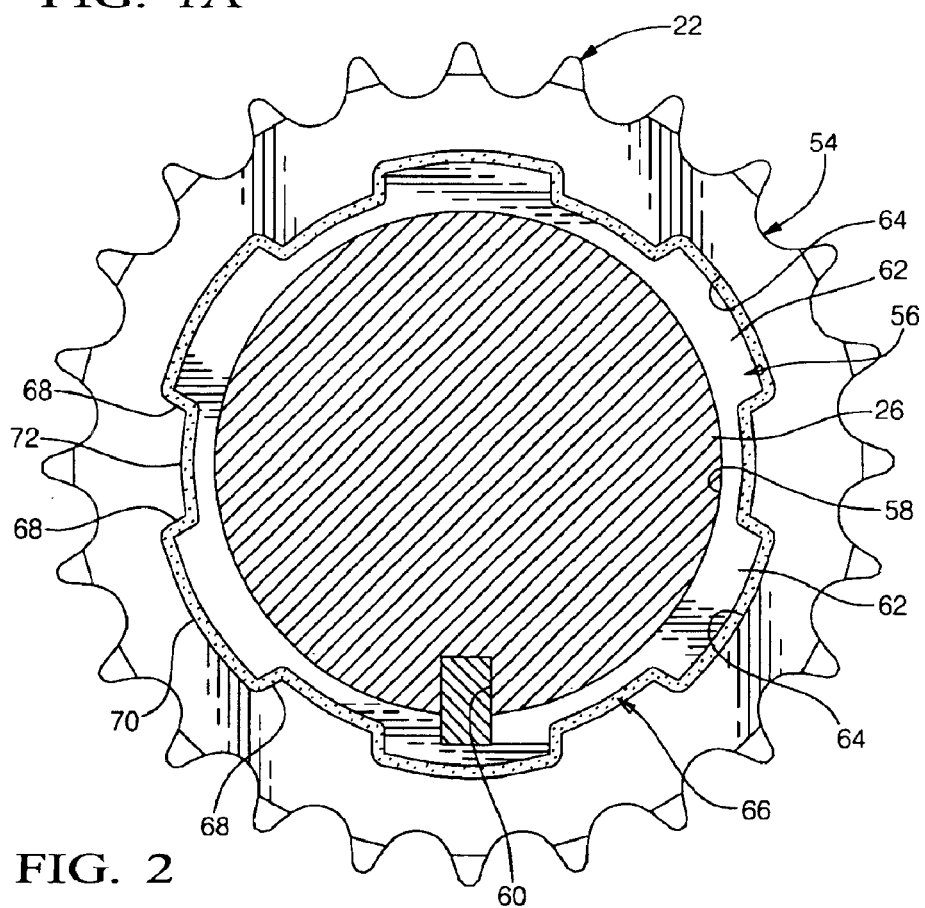
FIG. 2 is a partial cross-sectional view through the first balance shaft drive sprocket of the embodiment of FIG. 1 illustrating the elastomeric isolation ring mounted between the inner and outer splines of the sprocket assembly.

Referring now to both FIGS. 1 and 2, the first input sprocket 22 is made up as an assembly including a toothed outer ring 54 and an internal hub 56. The hub has an inner diameter 58 which is provided with an angular locater, such as a D flat or a key slot 60, for drivingly connecting and maintaining the phase angle of the hub 56 with the first balance shaft 26. On its exterior, the hub is provided with relatively wide and shallow male splines 62.

The interior of the toothed outer ring 54 is provided with mating female splines 64, which are loosely engaged with the male splines 62 of the inner hub 56. The shallow splines are engaged with a substantial clearance between them but having a sufficient height that the splines will engage one another so as to maintain the drive position of the hub and outer ring with only a small angular change in position even if the angular clearance between the splines is closed.

The clearance between the splines is filled with a splined isolator ring 66 which is configured to be forced into the clearance to fill the space between the internal and external splines of the assembly. The inner periphery of the isolator ring 66 is configured for meshing engagement with the male splines 62 of the splined hub 56. As shown in FIG. 2, the outer periphery of the isolator ring 66 is defined by radial walls 68 and arc walls 70, 72 extending between the radial walls and engaging the splined internal faces of the toothed outer ring 54 for compression fitted engagement therewith.

The material selected for the splined isolator ring is preferably a compliant or elastomeric material such as a nitrile rubber. Alternatively, a less compliant material such as nylon, Teflon or a phenolic may be utilized in some instances. It is necessary that the material selected have good oil resistance properties. A preferred elastomeric rubber ring should be maintained in compression between the splines to provide maximum life for the rubber material in its vibration isolating function.

Figure 1A:
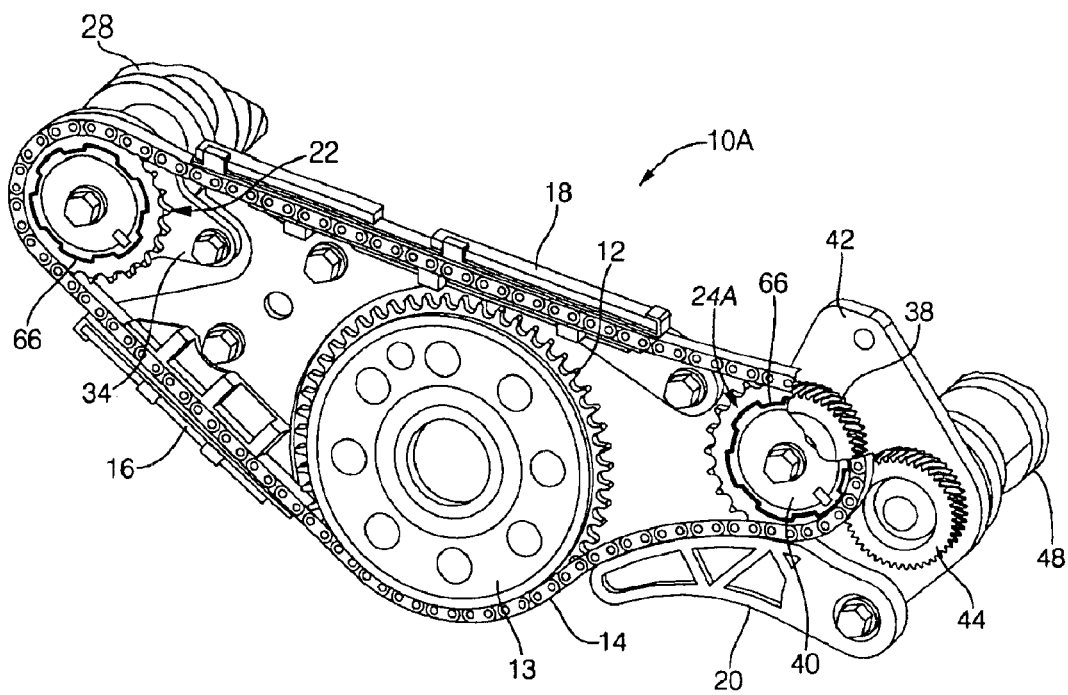
FIG. 1A is a similar view showing an alternative embodiment.

FIG. 1A shows an optional second embodiment of engine balancer 10A, according to the invention, which is similar to balancer 10 and in which like numerals indicate like parts. Balancer 10A differs only in that the second input sprocket 24A is also provided with an isolator ring 66 configured and mounted as shown in FIG. 2 for the first input sprocket 22. Alternatively, a splined isolator ring of like configuration could be placed between the shaft 40 and the drive gear 48 or installed within the drive gear 38 made as an assembly with inner and outer spines as shown for the first input sprocket 22. It is contemplated that installation of an isolator ring in the drive sprocket or mechanism for a second balance shaft could be effective in some applications of dual balance shafts. However, in the illustrated embodiment 10 of FIG. 1, the additional reduction in chain noise transmitted from the engine has not been shown to warrant use of the second isolator ring in the assembly as currently envisioned.

In operation of the engine balancer as described, rotation of the engine crankshaft 13 drives the output sprocket 12, pulling the chain 14 around the first and second input sprockets 22, 24 so as to rotate their connected balance shafts 26, 46, respectively. It is believed that, since the chain load on the first input sprocket 22 is greater than on the second sprocket 24 and the chain wrap around the input sprockets 20, 24 is greater and at a sharper angle than that around the output sprocket 12, the major source of chain noise in the assembly comes from engagement of the chain teeth with the heavily loaded teeth of the first input sprocket 22.

The transmission of vibration caused by these tooth engagements from the sprocket 22 to the connected first balance shaft 26 is essentially interrupted or damped by the elastomeric isolator ring 66 mounted within the first input sprocket 22. Accordingly, the chain whine vibration normally transmitted into the first balance shaft is significantly reduced or decoupled along with the resultant vibration of the engine wall to which the balance shaft is mounted. Thus, a significant reduction in chain noise transmitted into and from the engine is accomplished.

The present invention has proven effective in reduction of chain noise by application of a splined isolator ring to the most heavily loaded sprocket of a chain driven dual shaft balancer in an engine where the chain noise was transmitted to a crankcase wall which resulted in audible chain noise transmission. It is thus contemplated that application of a similar splined isolator to other single or multiple balancer chain sprockets may be effective in reducing chain noise transmission from the chain sprockets into associated structure of an engine, resulting in a quieting of structure borne noise while minimizing any compromise of the balancer function in case of degradation or failure of the splined isolator material.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An engine balancer comprising:

first and second rotatable balance shafts adapted to be driven in timed relation to rotation of an engine output shaft;

a rotary output member drivable by the output shaft;

first and second rotary input members operative respectively to drive the first and second balance shafts;

a drive chain connecting the output and input members such that the first input member is driven directly by the chain from the output member and the second input member is driven by the chain from the first input member whereby the chain is capable of producing in operation a vibration causing an audible chain whine in associated engine structure carrying the balance shafts;

the first input member being connected with the balance shaft by mating internal and external splines connected one with each of the first input member and the first balance shaft and positioned in loose meshing engagement for drivingly connecting the first input member with the first balance shaft, wherein the splines are relatively wide and shallow, having substantially greater width than their radial extent, which is sufficient to maintain engagement should angular clearance between the splines be closed; and a splined isolator ring disposed exclusively between and engaging the internal and external splines, the isolator ring being formed of a compliant material to minimize vibration transmission to the associated engine structure.

2. An engine balancer as in claim 1 wherein the isolator ring is disposed in the first input member.

3. An engine balancer as in claim 2 wherein the second input member is connected with a drive gear that engages a driven gear driving the second balance shaft in reverse direction from that of the first balance shaft.

* * * * *